United States Patent
Felderman et al.

(10) Patent No.: US 8,099,397 B2
(45) Date of Patent: Jan. 17, 2012

(54) APPARATUS, SYSTEM, AND METHOD FOR IMPROVED PORTABLE DOCUMENT FORMAT ("PDF") DOCUMENT ARCHIVING

(75) Inventors: Gregory S. Felderman, San Jose, CA (US); Brian K. Hoyt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/548,217

(22) Filed: Aug. 26, 2009

(65) Prior Publication Data
US 2011/0055162 A1    Mar. 3, 2011

(51) Int. Cl.
G06F 7/00       (2006.01)
F06F 17/00      (2006.01)

(52) U.S. Cl. .................................. 707/667; 707/673
(58) Field of Classification Search .................. None
See application file for complete search history.

(56) References Cited

U.S. PATENT DOCUMENTS

| | | | |
|---|---|---|---|
| 6,035,287 A | 3/2000 | Stallaert et al. | |
| 6,415,278 B1 * | 7/2002 | Sweet et al. | 707/770 |
| 6,801,673 B2 | 10/2004 | Chao et al. | |
| 6,895,550 B2 | 5/2005 | Kanchirayappa et al. | |
| 6,992,786 B1 | 1/2006 | Breding et al. | |
| 7,010,793 B1 | 3/2006 | Chatterjee et al. | |
| 7,013,309 B2 | 3/2006 | Chakraborty et al. | |
| 7,020,837 B1 * | 3/2006 | Kueny | 715/234 |
| 7,242,685 B1 | 7/2007 | Rash et al. | |
| 2004/0199876 A1 | 10/2004 | Ethier et al. | |
| 2005/0125724 A1 | 6/2005 | Peiro et al. | |
| 2005/0203919 A1 | 9/2005 | Deutsch et al. | |
| 2006/0053119 A1 | 3/2006 | Aden et al. | |
| 2006/0190493 A1 | 8/2006 | Kawai et al. | |
| 2006/0200457 A1 | 9/2006 | McCammon et al. | |
| 2007/0055933 A1 | 3/2007 | Dejean et al. | |
| 2007/0088671 A1 | 4/2007 | McElroy et al. | |
| 2007/0100865 A1 | 5/2007 | King et al. | |
| 2007/0136363 A1 | 6/2007 | Thielen | |
| 2007/0180493 A1 | 8/2007 | Croft et al. | |

(Continued)

OTHER PUBLICATIONS

Office Action received from USPTO, U.S. Appl. No. 12/250,109.

(Continued)

*Primary Examiner* — Kuen Lu
*Assistant Examiner* — Tuan A Pham
(74) *Attorney, Agent, or Firm* — Kunzler Needham Massey & Thorpe

(57) ABSTRACT

An apparatus, system, and method are disclosed for improved Portable Document Format ("PDF") document archiving. The method includes scanning a source PDF document for a shared resource. The source PDF document includes a plurality of records. The shared resource includes a common resource referenced by way of a resource pointer associated with a record of the source PDF document. The method includes copying the shared resource to a resource group associated with the source PDF document. The method also includes short-circuiting a link between content for the shared resource and the resource pointer in each record that points to the shared resource. The method includes extracting a record from the source PDF document. The extracted record is void of content for the shared resource in response to the short-circuited link. Thus, records may be stored in a standalone format without excessive storage space requirements.

16 Claims, 7 Drawing Sheets

U.S. PATENT DOCUMENTS

| | | |
|---|---|---|
| 2007/0183000 A1 | 8/2007 | Eisen et al. |
| 2008/0028333 A1 | 1/2008 | Perelman et al. |
| 2008/0084573 A1 | 4/2008 | Horowitz et al. |
| 2008/0112013 A1 | 5/2008 | Ferlitsch et al. |
| 2008/0148142 A1 | 6/2008 | Lee et al. |
| 2008/0184107 A1 | 7/2008 | Chew et al. |

OTHER PUBLICATIONS

Fanning, "Preserving the Data Explosion: Using PDF," DPC Technology Watch Series Report 08-02, Apr. 2008.

Shanmugasundaram et al., "Automatic Reassembly of Document Fragments Via Data Compression," 2nd Digital Forensics Research Workshop, 2003, http://www.acsac.org/2003/papers/97.pdf.

PDFlib Text Extraction Toolkit (TET) Reference Manual, Version 2.2, PDFlib GmbH Muenchen, Germany, www.pdflib.com, c 2002-2007.

Hassan et al, "Intelligent Text Extraction from PDF Documents," Database and Artificial Intelligence Group, Institute of Information Systems, IEEE, c 2005.

* cited by examiner

APPARATUS, SYSTEM, AND METHOD FOR IMPROVED PORTABLE DOCUMENT FORMAT ("PDF") DOCUMENT ARCHIVING

BACKGROUND

1. Field of the Invention

This invention relates to archiving and more particularly relates to improved Portable Document Format ("PDF") document archiving.

2. Description of the Related Art

Records and statements are often stored electronically using Portable Document Format ("PDF"). Often, many individual statements or records are combined into a single PDF document as a report. When archiving PDF reports containing multiple records, these records may need to be stored as individual PDF documents in order to satisfy performance or functional requirements. For example, placing legal holds on a subset of records or placing one or more records into a work flow process is simplified by working with individually stored records instead of the report that includes many records.

However, when extracting a portion of a larger PDF documents and storing the portion as a standalone PDF document using the PDF Application Programming Interface ("API"), the PDF shared resources are duplicated in every extracted portion, thereby increasing storage requirements. Some solutions accept this increased storage requirement as is or do not extract the records at all and instead simply archive the entire report as a single entity. However, when an individual record is required to view or print, the entire report has to be retrieved in order to extract the requested report, thereby requiring more computing resources and decreasing performance.

BRIEF SUMMARY

From the foregoing discussion, it should be apparent that a need exists for an apparatus, system, and method for improved Portable Document Format ("PDF") archiving. Beneficially, such an apparatus, system, and method would enable individual record extraction while minimizing required storage space.

The present invention has been developed in response to the present state of the art, and in particular, in response to the problems and needs in the art that have not yet been fully solved by currently available PDF archiving tools. Accordingly, the present invention has been developed to provide an apparatus, system, and method for improved PDF archiving that overcome many or all of the above-discussed shortcomings in the art.

One embodiment of the method for improved Portable Document Format ("PDF") archiving includes scanning a source PDF document for a shared resource, copying the shared resource, short-circuiting a link, and extracting a record. The method includes scanning a source PDF document for a shared resource. The source PDF document includes a plurality of records. The shared resource includes a common resource referenced by way of a resource pointer associated with a record of the source PDF document.

The method includes copying the shared resource to a resource group associated with the source PDF document. The method also includes short-circuiting a link between content for the shared resource and the resource pointer in each record that points to the shared resource. The method includes extracting a record from the source PDF document. The extracted record is void of content for the shared resource in response to the short-circuited link.

In one embodiment, extracting a record from the source PDF document further comprises extracting a record using a PDF Application Programming Interface ("API"). In one embodiment, short-circuiting a link further comprises modifying the resource pointer to point to the copied shared resource in the resource group. In a further embodiment, modifying the resource pointer includes setting the resource pointer to a resource identifier assigned by a PDF Application Programming Interface ("API") that stores the shared resource in the resource group.

In one embodiment, short-circuiting a link between content for the shared resource and the resource pointer further includes removing content for the shared resource from the source PDF document. In certain embodiments, the method further includes indexing index data in the source PDF document and storing the index data in a searchable repository In one embodiment, the resource group includes a PDF document. In certain embodiments, scanning a source PDF document for a shared resource further includes directing a PDF API to signal each shared resource of the source PDF document that matches a predetermined criteria. In one embodiment, the method includes receiving configuration information that defines a set of shared resources from among the shared resources of the source PDF document.

An apparatus and computer program product are also provided for improved PDF document archiving each providing a plurality of components, modules, and operations to functionally execute the necessary steps described above in relation to the method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
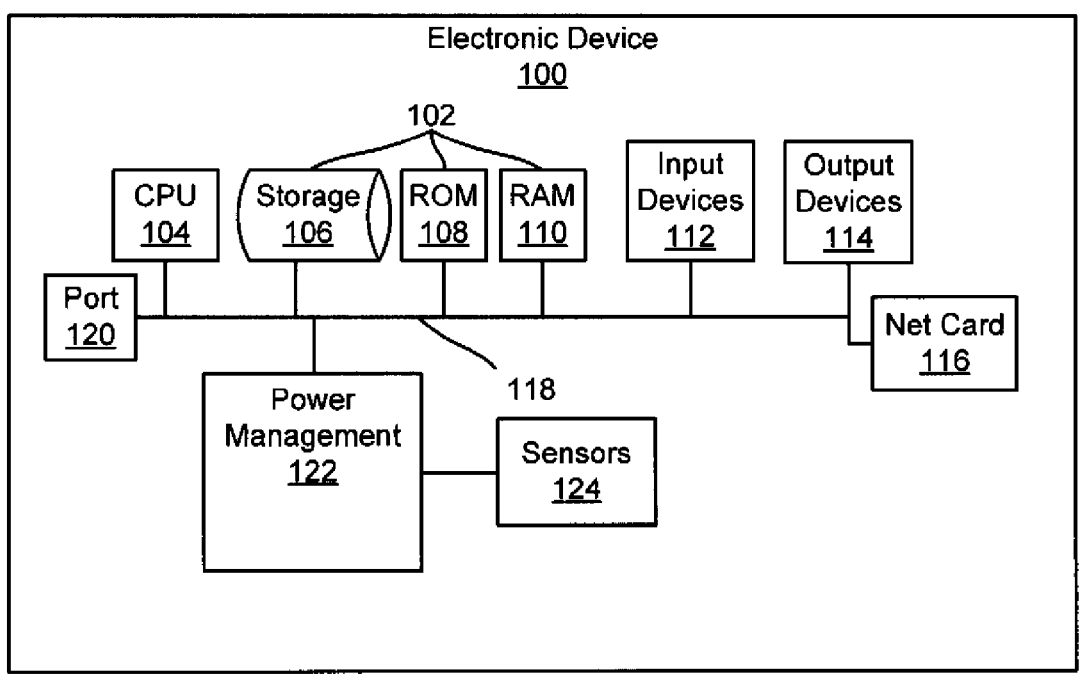
FIG. 1 is a block diagram of one embodiment of a hardware system capable of executing an embodiment for improved Portable Document Format ("PDF") document archiving.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 illustrates one embodiment of an electronic device 100 suitable for executing computer program code for one or more embodiments of the present invention. In certain embodiments, the electronic device 100 is a computer. The electronic device 100 may constitute any type of electronic equipment, including a tablet computer, a PDA, and the like.

The electronic device 100 may include a processor or CPU 104. The CPU 104 may be operably coupled to one or more memory devices 102. The memory devices 102 may include a non-volatile storage device 106 such as a hard disk drive or CD ROM drive, a read-only memory (ROM) 108, and a random access volatile memory (RAM) 110.

The computer in general may also include one or more input devices 112 for receiving inputs from a user or from another device. The input devices 112 may include a keyboard, pointing device, touch screen, or other similar human input devices. Similarly, one or more output devices 114 may be provided within or may be accessible from the computer. The output devices 114 may include a display, speakers, or the like. A network port such as a network interface card 116 may be provided for connecting to a network.

Within an electronic device 100 such as the computer, a system bus 118 may operably interconnect the CPU 104, the memory devices 102, the input devices 112, the output devices 114, the network card 116, and one or more additional ports. The ports may allow for connections with other resources or peripherals, such as printers, digital cameras, scanners, and the like.

The computer also includes a power management unit in communication with one or more sensors. The power management unit automatically adjusts the power level to one or more subsystems of the computer. Of course, the subsystems may be defined in various manners. In the depicted embodiment, the CPU 104, ROM 108, and RAM 110 may comprise a processing subsystem. Non-volatile storage 706 such as disk drives, CD-ROM drives, DVD drives, and the like may comprise another subsystem. The input devices 712 and output devices 114 may also comprise separate subsystems.

Figure 2:
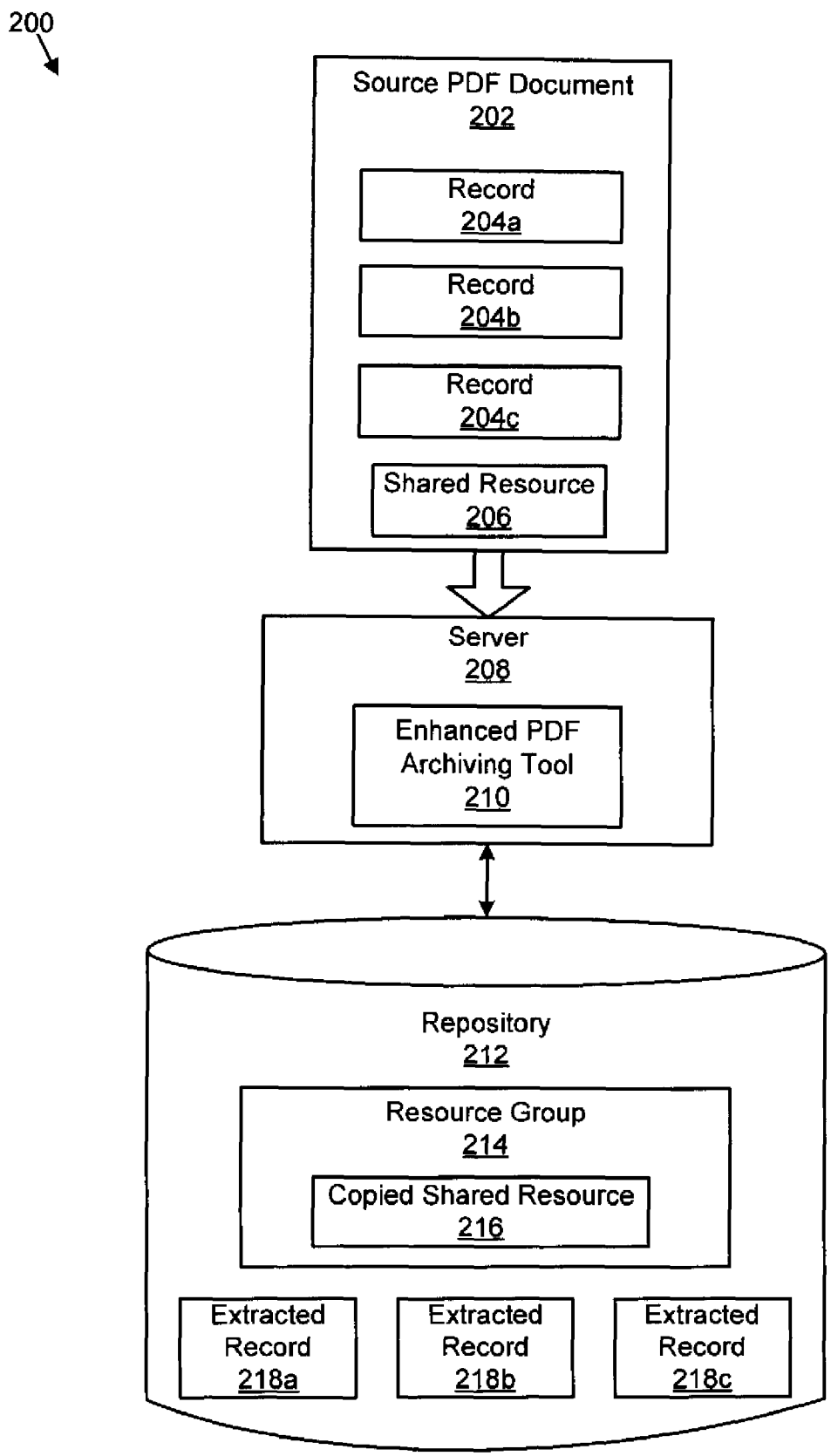
FIG. 2 is a schematic block diagram illustrating one embodiment of a system for improved Portable Document Format ("PDF") document archiving in accordance with the present invention.

FIG. 2 illustrates one embodiment of a system 200 for improved Portable Document Format ("PDF") document archiving in accordance with the present invention. The system 200 includes a source PDF document 202 that includes a plurality of records 204*a-c* and a shared resource 206. The system 200 also includes a server 208 with an enhanced PDF archiving tool 210 and a repository 212 with a resource group 214 and a plurality of extracted records 218a-c. The resource group 214 includes a copied shared resource 216. Those of skill in the art recognize that the system 200 may be simpler or more complex than illustrated, so long as the system 200 includes modules or sub-systems that correspond to those described herein.

The source PDF document 202 is a report, collection, or aggregation of records 204 in PDF format. As used herein, a record 204 is an individual document comprising a collection of fields of data represented as at least a portion of a PDF document. The records 204, also referred to as statements, may include various forms of archived documents such as customer bank statements, monthly utility statements, credit card statements, and the like. The records 204, while combined in the source PDF document 202, may require individual access. The records 204, while independent of one another, may share common characteristics or objects such as images, fonts, and the like. A common object may be represented in the PDF document as a shared resource 206.

As used herein, a shared resource 206 is a resource or object in a PDF document that is common to, or shared among a plurality of records of the PDF document. The shared resource 206, also known as an indirect object, is represented in the PDF document as a CosObj, or general object in a PDF file. Examples of shared resources 206 include images, custom fonts, logos on the same location of each page, and the like. Shared resources 206 may help to reduce the size of a PDF document. For example, if a certain logo appears in multiple places in the document, the logo may be represented by a shared resource 206. Thus, a single image of the logo is saved instead of multiple images for each place the logo appears. Places within the PDF document that would have included a copy of the image may include a pointer to the shared resource 206 instead.

The shared resource 206 is referenced by way of one or more resource pointers associated with the records 204 of the source PDF document 202. As used herein, a resource pointer links a location in a PDF document and a shared resource 206 and/or content of the shared resource 206. In one embodiment, a resource pointer is a pointer in the source PDF document 202 to the shared resource 206 embedded within the source PDF document 202. In another embodiment, a resource pointer is a pointer inside the shared resource 206 to the content for that shared resource 206 as described below.

Specifically, the resource pointer may be a pointer or indicator in each record 204 that points to the shared resource 206. In one embodiment, the resource pointer is a shared resource dictionary that includes information associated with the shared resource 206. Each shared resource 206 may include a dictionary defining the shared resource 206. The dictionary describes certain aspects about the object, such as width and height for an image. Each shared resource 206 also includes associated content in the form of a stream data. The stream data follows the dictionary. For example, a shared resource 206 that is a logo image would have binary data representing the logo as the stream data.

The server 208 may be an electronic device such as a computer workstation, a computer system, an appliance, an application-specific integrated circuit ("ASIC"), a Personal Digital Assistant ("PDA"), a server, a server blade center, a server farm, a router, a switch, or the like. Furthermore, the server 208 may comprise a software application running on one or more electronic devices similar to those described above. In one embodiment, the server 208 comprises an electronic device similar to the electronic device 100 depicted in FIG. 1.

The server 208 includes the enhanced PDF archiving tool 210. The enhanced PDF archiving tool 210 resides on the server 208 and may be implemented on memory of the server 208. The enhanced PDF archiving tool 210 extracts individual records 204 from the source PDF document 202 while minimizing storage space requirements. Furthermore, the enhanced PDF archiving tool 210 uses a standard PDF Application Programming Interface ("API") to extract individual records 204.

The PDF API recognizes a link between a shared resource 206 and portions, such as records, of a PDF document that have a pointer to the shared resource 206. Therefore, the PDF API duplicates shared resources 206 including content of the shared resources 206 whenever a portion of a PDF document that has pointers to the shared resources 206 is extracted. Such copying behavior is standard for the PDF API and is not programmatically alterable through calls in the PDF API. For example, if a record 204a has a resource pointer to a shared resource 206 and the record 204 is extracted to a standalone PDF file through the PDF API, the shared resource 206 is duplicated to the standalone PDF file 218a. If a second record 204b that also includes a resource pointer to the shared resource 206 is extracted to a second standalone PDF file, the PDF shared resource 206 is also duplicated into the second PDF file 218b. Therefore, the shared resources 206 are duplicated for each extracted record 218, thus increasing storage requirements.

The enhanced PDF archiving tool 210 first copies shared resources 206 from the source PDF document 202 and then stores them into a resource group 214. The enhanced PDF archiving tool 210 may modify the dictionary associated with the shared resource 206 in the source PDF document 202 to point to the copied shared resource 216 in the resource group 214. The enhanced PDF archiving tool 210 may also clear the content for the shared resource from the source PDF document 202. As a result, the enhanced PDF archiving tool short-circuits or breaks the link between content of the shared resource 206 and a record 204 in the source PDF document 202.

The enhanced PDF archiving tool 210 extracts the record 204 and stores the extracted record 218 in the repository 212. Furthermore, the shared resources 206 are not duplicated along with the extracted record 218. In addition, the extracted record 218 references the copied shared resource 216 in the resource group 214. As a result, storage space is minimized. Beneficially, the PDF API may still be used, eliminating the need to write custom computer code for PDF document extraction. Furthermore, because the extracted records 218 have already been individually saved, they may be quickly referenced with less overhead than if the records 204 had to be extracted on demand.

The repository 212, as mentioned above, stores the resource group 214. The repository 212 may be implemented with a storage device such as a disk drive as is known in the art. The resource group 214 includes a copied shared resource 216 copied from the source PDF document 202 with the enhanced PDF archiving tool 210. The resource group 214 may be embodied as a PDF document or other file compatible with the PDF API.

The repository 212 also stores extracted records 218 extracted from the source PDF document 202 as described above. Each extracted record 218 may be a standalone PDF document. Furthermore, each extracted record 218 may reference the copied shared resource 216 in the resource group 214.

Figure 3A:
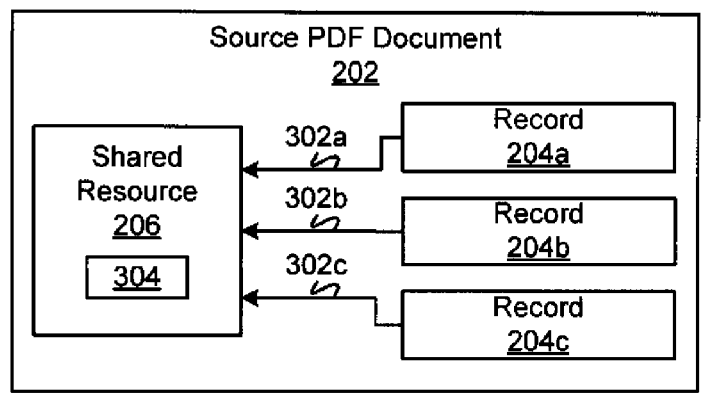
FIG. 3A is a detailed schematic block diagram illustrating a source Portable Document Format ("PDF") document in accordance with the present invention.

FIG. 3A illustrates the source PDF document 202 depicted in FIG. 2. The source PDF document 202 includes a plurality of records 204a-c and a shared resource 206. Moreover, each record includes a resource pointer 302 to the shared resource 206. As described in greater detail below, the resource pointer 302 is an indicator that links a shared resource 206 with a record 204 in the source PDF document 202.

Additionally, the shared resource 206 includes content 304 for the shared resource 206. If a record 204a were to be extracted with the resource pointer 302a pointing to the shared resource 206 embedded in the source PDF document 202, the shared resource 206, including the content 304 of the shared resource 206 would also be duplicated for the extracted record.

Figure 3B:
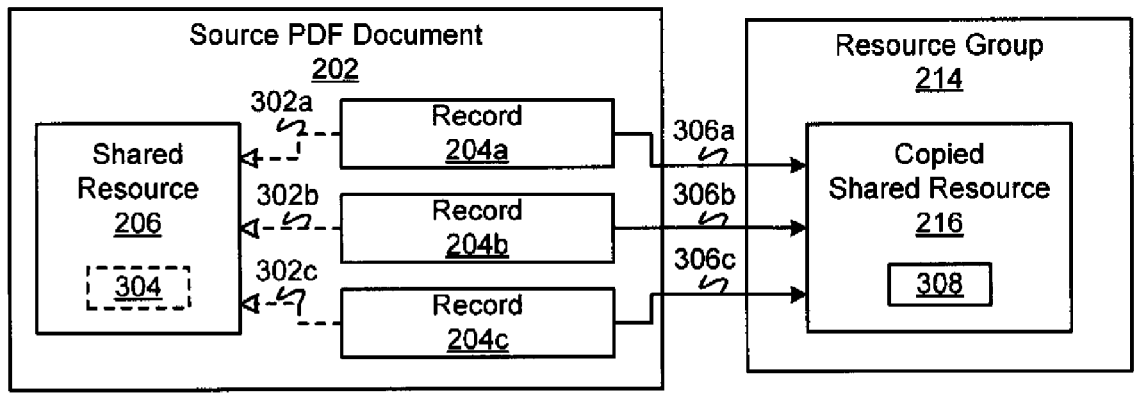
FIG. 3B is a detailed schematic block diagram illustrating a source Portable Document Format ("PDF") document and a resource group in accordance with the present invention.

FIG. 3B illustrates the source PDF document 202, shared resource 206, and the records 204a-c as in FIG. 3A. FIG. 3B also includes a resource group 214 with a copied shared resource 216 and copied content 308. Moreover, the link between each record and the shared resource 206 has been short-circuited. As described in greater detail below, the link may be short-circuited by modifying the resource pointers 302 and/or removing the content 304. Therefore, FIG. 3B also includes modified resource pointers 306 from each record 204 to the copied shared resource 216. If a record 204a were to be extracted with a modified resource pointer 306a and the content 304 removed from the shared resource 206, the content 304 will not be duplicated in the extracted record. The modified resource pointer 306 and/or PDF object for the shared resource 206 may still be duplicated into the extracted record, but the modified resource pointer 306 and PDF object for the shared resource 206 will be free from the actual content 304. Advantageously, the modified resource pointer 306 and/or the PDF object for the shared resource 206 will also be greatly reduced in size since the actual content 304 typically requires a proportionally higher storage space.

In one embodiment, each record 204 continues to point to the shared resource 206 and the links between the records and the shared resource are unaffected. However, the shared resource 206, being free of the content 304 (lacking the content 304), has its resource pointer 306 modified to point to the copied shared resource 216 and associated copied content 308. Therefore, if a PDF API extracts a record and the PDF API follows the PDF protocol limitation of duplicating the shared resource 206, the PDF API duplicates the shared resource 206 along with the extracted record, however, the content 304 of the shared resource 206 is missing. A pointer to the copied shared resource 216 may reside in the place of the content 304.

Figure 3C:
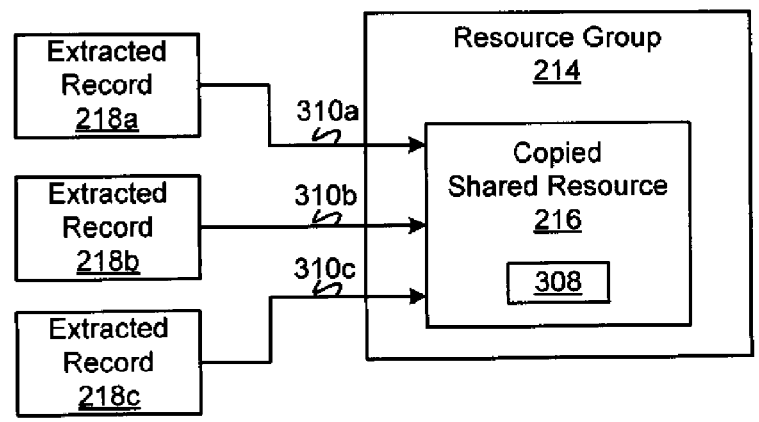
FIG. 3C is a detailed schematic block diagram illustrating extracted records and a resource group in accordance with the present invention.

FIG. 3C illustrates a plurality of extracted records 218a-c and the resource group 214 with the copied shared resource 216 from FIG. 3B. Each extracted record 218 is free from the content 304 of the shared resource 206. Instead, each extracted record 218 has an extracted resource pointer 310 pointing to the copied shared resource 216 and the copied content 308. Thus, storage space is greatly reduced, as each extracted record 218 shares the same content 308 which is not duplicated for each extracted record 218.

Figure 4:
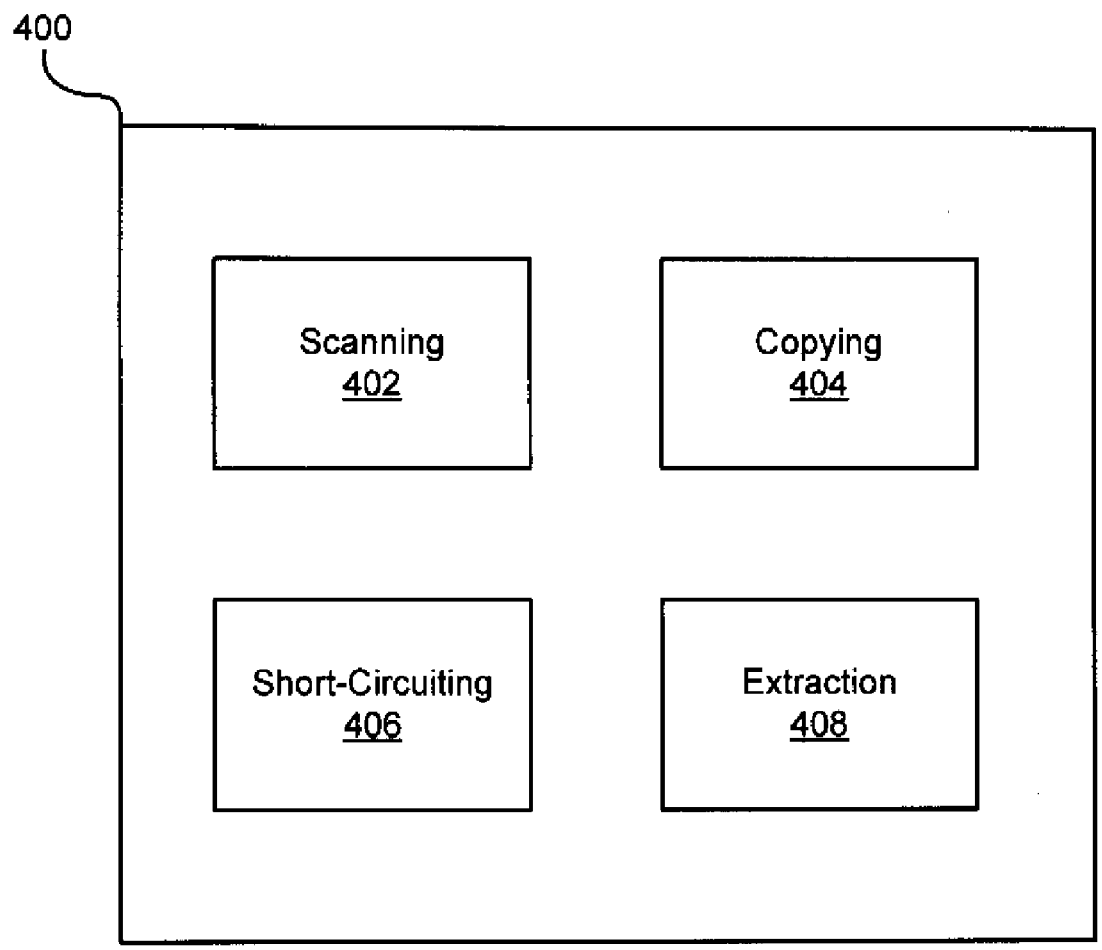
FIG. 4 is a schematic block diagram illustrating one embodiment of an apparatus for improved Portable Document Format ("PDF") document archiving in accordance with the present invention.

FIG. 4 illustrates one embodiment of an apparatus 400 for improved PDF document archiving in accordance with the present invention. The apparatus 400 constitutes one embodiment of the enhanced PDF archiving tool 210 and includes a scanning module 402, a copying module 404, a short-circuiting module 406, and an extraction module 408.

The scanning module 402 scans a source PDF document 202 for a shared resource 206. The source PDF document 202 includes a plurality of records 204. As described above, each record 204 may represent a single document or statement that may need to be later viewed, printed or held for legal reasons. The shared resource 206 is a common resource referenced by way of a resource pointer 306 associated with a record 204 of the source PDF document 202.

In one embodiment, the resource pointer 306 is a pointer in a record 204 to the dictionary of the shared resource 206. In another embodiment, the resource pointer 306 is the dictionary of the shared resource 206 or the CosObj representing the shared resource 206. In a further embodiment, the resource pointer is a combination of a pointer in a record 204 to the dictionary of the shared resource 206 and the dictionary itself. One of ordinary skill in the art realizes the various ways that a shared resource 206 is linked with a record 204 in the source PDF document 202.

In one embodiment, the scanning module 402 scans a source PDF document 202 for a shared resource 206 through a PDF API. The PDF API, in one embodiment, enumerates the indirect objects of the PDF source document to locate shared resources 206 that match predetermined criteria as is described in greater detail below.

The copying module 404 copies the shared resource 206 to a resource group 214 associated with the source PDF document 202. In one embodiment, the resource group 214 is an additional PDF document. In certain embodiments, the copying module 404 copies the shared resource 206 to the resource group 214 PDF by appending the CosObj representing the shared resource 206 to the resource group 214 PDF document. In one embodiment, the PDF API assigns a resource identifier to the appended CosObj in the resource group 214 PDF. Copying the shared resource 206, in one embodiment, includes copying the content 304 for the shared resource 206 to the resource group 214.

The short-circuiting module 406 short-circuits a link between content 304 for the shared resource 206 and the resource pointer 306 in each record 204 that points to the shared resource 206. As described in greater detail below, the short-circuiting module 406 may short-circuit the link by modifying the resource pointer 306 associated with the shared resource 206 in the source PDF document 202. The short-circuiting module 406 may also remove the content 304 associated with the shared resource 206.

The extraction module 408 extracts a record 204 from the source PDF document 202. Because the link between the shared resource 206 and the record 204 has been broken, the extracted record 218 is void of content 304 for the shared resource 206. The PDF API may still copy the PDF object representing the shared resource 206 from the source PDF document 202, but the PDF object will be free of content 304 from the shared resource 206 as described in greater detail below.

In one embodiment, the extraction module 408 extracts a record 204 from the source PDF document 202 using a PDF API. The extraction module 408 may extract records 204 based on a predetermined identifier that indicates the location in the source PDF document 202 where a new record 204 begins. For example, in a source PDF document 202 of bank statements, the extraction module 408 may search for text indicating the first page of a particular bank statement. The extraction module 408 may use this location along with the location of the first page of the next bank statement to extract the particular bank statement using the PDF API. In one embodiment, the extraction module 408 uses index data to determine the location in the source PDF document 202 of a record 204 to extract. Index data is described in further detail below.

Figure 5:
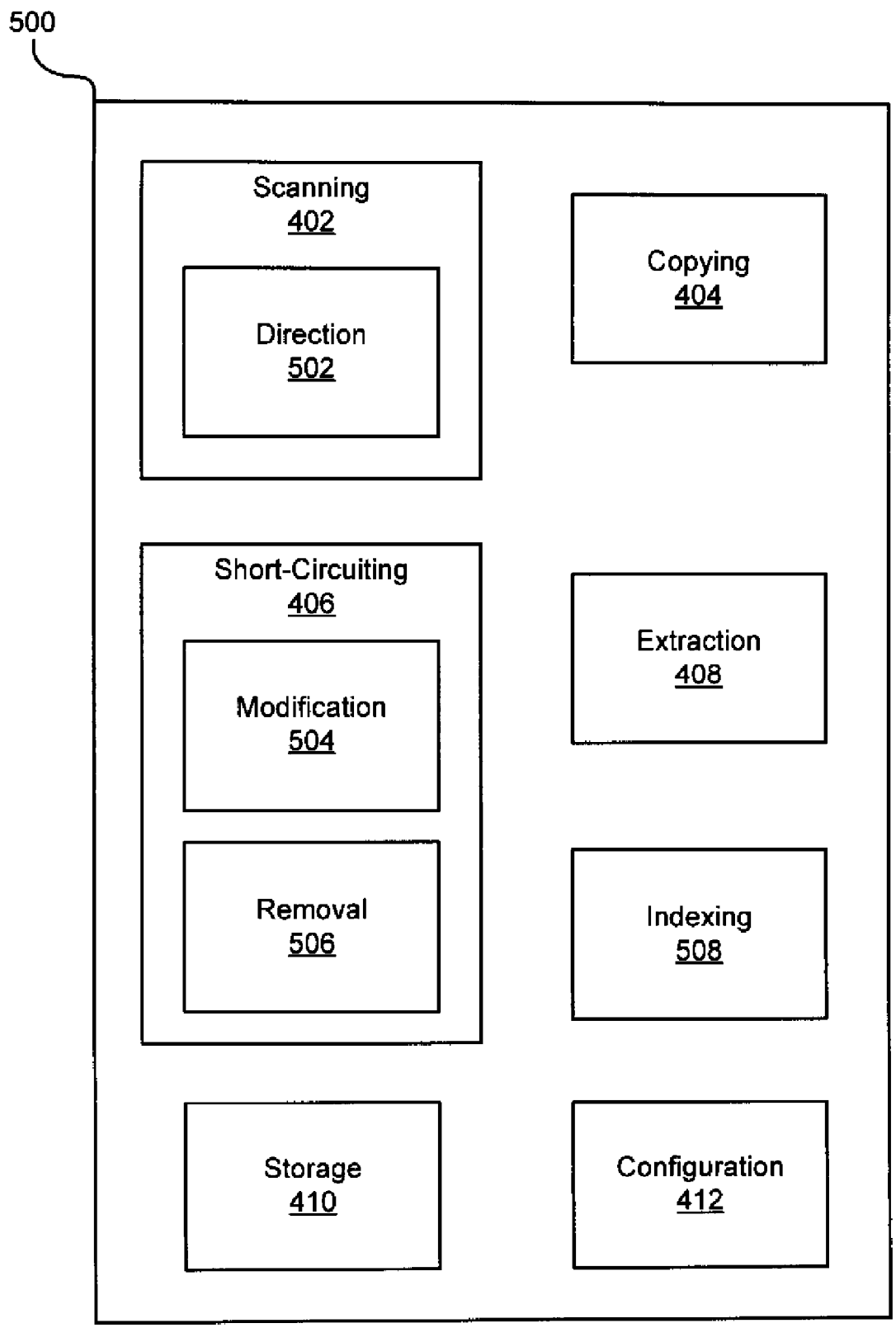
FIG. 5 is a detailed schematic block diagram illustrating another embodiment of an apparatus for improved Portable Document Format ("PDF") document archiving in accordance with the present invention.

FIG. 5 illustrates another embodiment of an apparatus 500 for improved PDF document archiving in accordance with the present invention. The apparatus 500 includes the scanning module 402, the copying module 404, the short-circuiting module 406, and the extraction module 408, wherein these modules include substantially the same features as described above in relation to FIG. 3. Additionally, in one embodiment, the scanning module 402 includes a direction module 502, the short-circuiting module 406 includes a modification module 504 and a removal module 506, and the apparatus 500 further includes an indexing module 508, a storage module 510, and a configuration module 512.

The direction module 502 directs a PDF API to signal each shared resource 206 of the source PDF document 202 that matches a predetermined criteria. The direction module 502 may use enumeration methods of the PDF API as is known in the art to receive a signal that a shared resource 206 meets the predetermined criteria. For example, the direction module 502 may direct the PDF API to return a reference to a shared resource 206 that is an image.

The modification module 504 modifies the resource pointer 306 to point to the copied shared resource 216 in the resource group 214. In one embodiment, the modification module 504 modifies the resource pointer 306 by setting the resource pointer 306 to the resource identifier assigned by the PDF API that stores the copied shared resource 216 in the resource group 214. The resource identifier may be a unique identifier, and in some embodiments, a new identifier used to identify the copied shared resource 216 in the resource group 214. The modification module 504 may create a key-value pair in the dictionary of the shared resource 206 to associate the assigned resource identifier of the copied shared resource 216 with a new key to be referenced by the records 204 of the source PDF document 202.

The removal module 506 removes content 304 for the shared resource 206 from the source PDF document 202. In one embodiment, removing the content 304 for the shared resource 206 also serves to short-circuit, or break the link between content 304 for the shared resource 206 and the record 204 that references the shared resource 206. The removal module 506 may remove content 304 for the shared resource 206 by setting the stream data in the source PDF document 202 to an empty stream. The PDF data object for the shared resource 206 remains in the source PDF document 202. However, the content 304 or stream data is removed by the removal module 506. The stream data is cleared after the shared resource 206 and the associated content 304 has been copied to the resource group 214 or the data may be lost.

The indexing module 508 indexes index data in the source PDF document 218. As is known in the art, index data may include identifiable data that is unique to each record 204 such that individual records 204 are locatable with a search and/or able to be isolated and extracted. The index data is used, in one embodiment, by the extraction module 408 to determine the location in the source PDF document 202 of a record 204. For example, the index data determines a page number from the source PDF document 202 where a record 204 begins and a page number where the record 204 ends.

The storage module 510 stores the index data in a searchable repository 212. Therefore, specific records may be obtained using a search through the index data. For example, a user may search by a customer name to retrieve bank statements related to that customer as is known in the art. The storage module 510 may also store the extracted records 218 in the repository 212.

The configuration module 512 receives configuration information that defines a set of shared resources 206 from among the shared resources 206 of the source PDF document 202. A user may input configuration information to specify a certain type of shared resource 206 for the scanning module 402 to locate.

Figure 6:
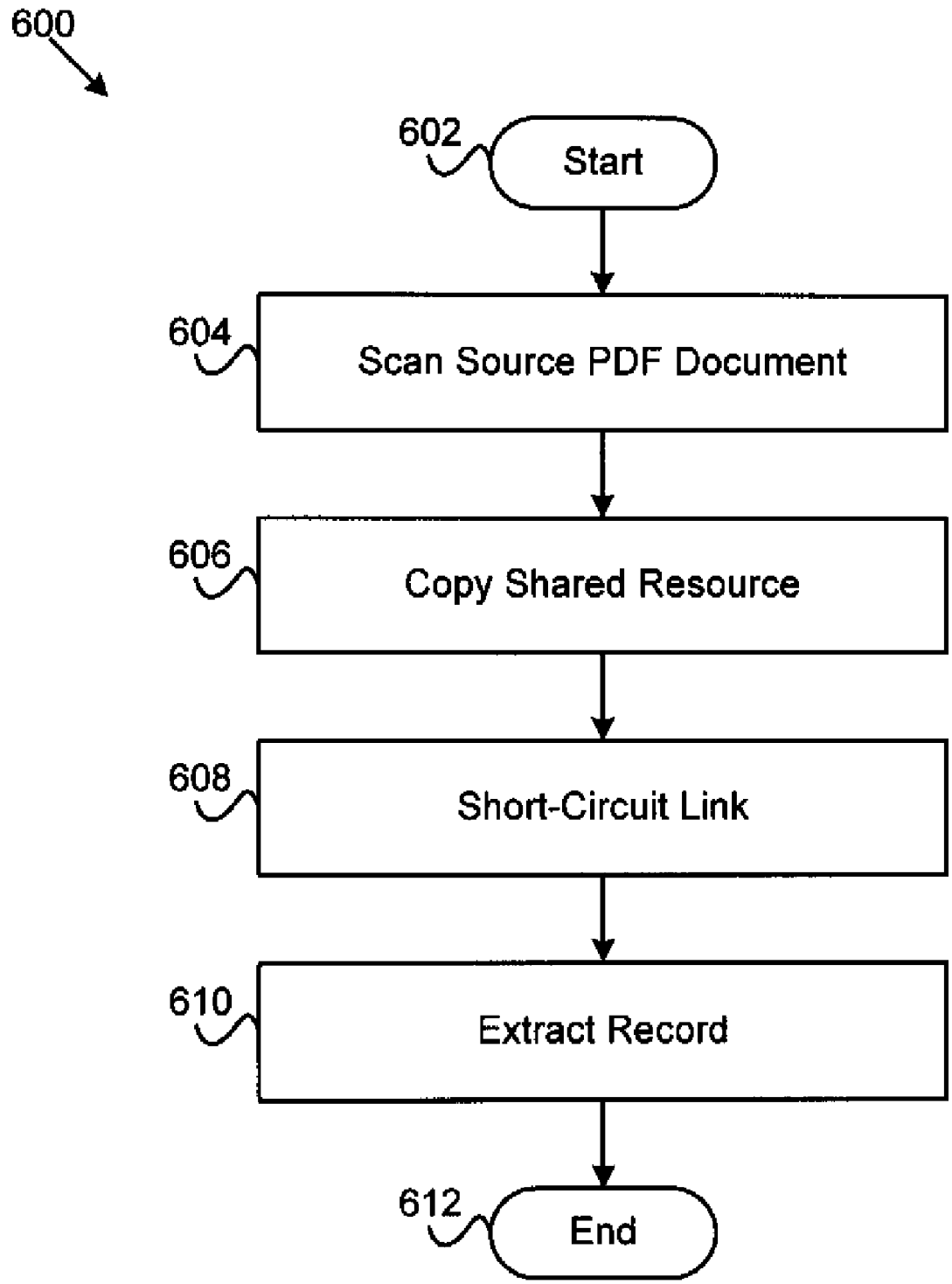
FIG. 6 is a schematic flow chart diagram illustrating one embodiment of a method for improved Portable Document Format ("PDF") document archiving in accordance with the present invention.

FIG. 6 illustrates one embodiment of a method 600 for improved PDF document archiving in accordance with the present invention. The method 600 starts 602 and the scanning module 402 scans 604 a source PDF document 202 for a shared resource 206. The source PDF document 202 includes a plurality of records 204. The shared resource 206 is a common resource referenced by way of a resource pointer 306 associated with a record 204 of the source PDF document 202. Next, the copying module 404 copies 606 the shared resource 206 to a resource group 214 associated with the source PDF document 202.

Next, the short-circuiting module 406 short-circuits 608 a link between content 304 for the shared resource 206 and the resource pointer 306 in each record 204 that points to the shared resource 206. The short-circuiting module 406 short-circuits 608 the link between content 304 for the shared resource 206 and the resource pointer 306 before the extraction module 408 extracts a record 204 from the source PDF document 202, or else the content 304 for the shared resource 206 will be unnecessarily duplicated. The extraction module 408 then extracts 610 a record 204 from the source PDF document 202 and the method 600 ends 612. The extracted record 218 is void of content 304 for the shared resource 206 so that the storage requirement does not increase by extracting a plurality of records 204.

Figure 7:
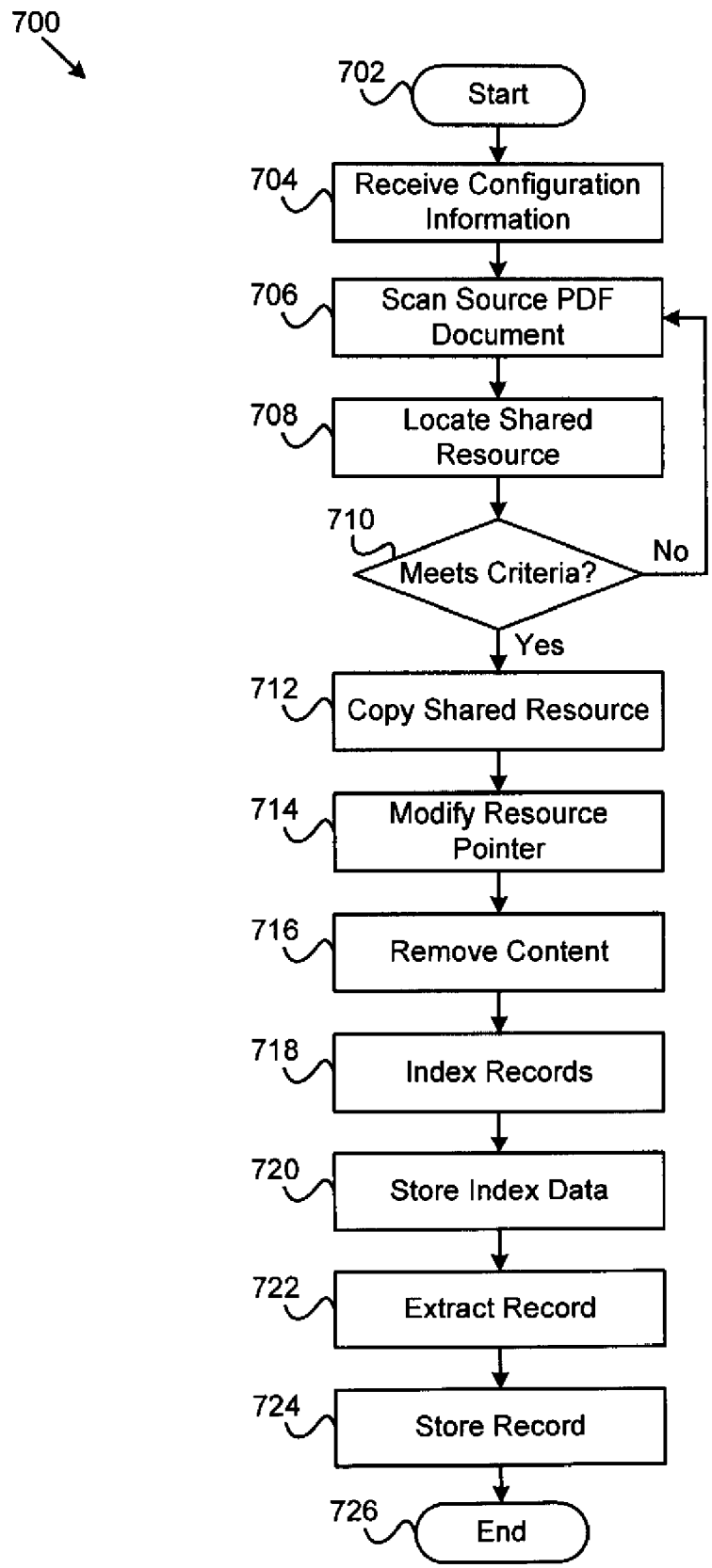
FIG. 7 is a detailed schematic flow chart diagram illustrating another embodiment of a method for improved Portable Document Format ("PDF") document archiving in accordance with the present invention.

FIG. 7 illustrates another embodiment of a method 700 for improved PDF document archiving in accordance with the present invention. The method 700 begins 702 and the configuration module 512 receives 704 configuration information defining a set of shared resources 206 from among the shared resources 206 of the source PDF document 202. For example, a user may wish to only locate images. The scanning module 402 then scans 706 a source PDF document 202 for a shared resource 206 that meets the criteria from the configuration information. The source PDF document 202 includes a plurality of records 204 such as bank statements. The scanning module 402 locates 708 a shared resource 206 and the direction module 502 receives a signal from the PDF API that the shared resource 206 meets 710 the predetermined criteria from the configuration information. If the direction module 502 fails to receive a signal from the PDF API indicating that the shared resource 206 meets 710 the criteria, the scanning module 402 continues scanning 706 for shared resources 206.

Returning to step 712, the copying module 404 copies 712 the shared resource 206 to a resource group 214 associated with the source PDF document 202. The resource group 214 may be a PDF document and the CosObj of the shared resource 206 may be copied by the copying module 404 into the PDF document for the resource group 214. Next, the modification module 504 modifies 714 the resource pointer 306 to point to the copied shared resource 216 in the resource group 214. The modification module 504 may add a new key-value pair referencing the resource identifier assigned for the copied shared resource 216 in the resource group 214. The removal module 506 then removes 716 content 304 for the shared resource 206 from the source PDF document 202 by clearing the stream in the object for the shared resource 206.

Because the dictionary of the shared resource 206 includes a new key-value pair referencing the copied shared resource 216 and the copied content 308 in the resource group 214 instead of content 304 for the shared resource 206 embedded in the source PDF document 202, and because the content 304 has been removed from the shared resource 206, the link that causes the PDF API to copy content 304 for the shared resource 206 along with an extracted record 218 is broken.

Next, the indexing module 508 indexes 718 index data in the source PDF document 202 and the storage module 510 stores 720 the index data in the repository 212. The extraction module then 408 extracts 722 a record 204 from the source PDF document 202. The extracted record 218 does not include content 304 for the shared resource 206. The extraction module 408 may use the index data to determine the location in the source PDF document 202 of each record 204 to extract. Then, the storage module 510 stores 724 the extracted record 218. Then the method 700 ends 726.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improved Portable Document Format ("PDF") document archiving, the method comprising:
   scanning by use of a processor, a source Portable Document Format ("PDF") document for a shared resource, the source PDF document comprising a plurality of records, the shared resource comprising a common resource referenced by way of a resource pointer associated with a record of the source PDF document;
   copying the shared resource to a resource group associated with the source PDF document;
   short-circuiting a link between content for the shared resource and the resource pointer in each record that points to the shared resource, wherein short-circuiting a link further comprises modifying the resource pointer to point to the copied shared resource in the resource group and wherein short-circuiting a link between the shared resource and the resource pointer further comprises removing content for the shared resource from the source PDF document; and
   extracting a record from the source PDF document, the extracted record void of the content for the shared resource in response to the short-circuited link.

2. The method of claim 1, wherein extracting a record from the source PDF document further comprises extracting a record using a PDF Application Programming Interface ("API").

3. The method of claim 2, wherein modifying the resource pointer comprises setting the resource pointer to a resource identifier assigned by a PDF Application Programming Interface ("API") that stores the shared resource in the resource group.

4. The method of claim 1, further comprising indexing index data in the source PDF document and storing the index data in a searchable repository.

5. The method of claim 1, wherein the resource group comprises a PDF document.

6. The method of claim 1, wherein scanning a source PDF document for a shared resource further includes directing a PDF API to signal each shared resource of the source PDF document that matches a predetermined criteria.

7. The method of claim 1, further comprising receiving configuration information that defines a set of shared resources from among the shared resources of the source PDF document.

8. An apparatus for improved Portable Document Format ("PDF") document archiving, the apparatus comprising:
   a non-transitory computer readable storage medium storing computer readable program code executable by a processor, the computer readable program code comprising:
   a scanning module configured to scan a source Portable Document Format ("PDF") document for a shared resource, the source PDF document comprising a plurality of records, the shared resource comprising a common resource referenced by way of a resource pointer associated with a record of the source PDF document;
   a copying module configured to copy the shared resource to a resource group associated with the source PDF document;
   a short-circuiting module configured to short-circuit a link between the shared resource and the resource pointer in each record that points to the shared resource, wherein the short-circuiting module further comprises a modification module configured to modify the resource pointer to point to the copied shared resource in the resource group and further comprises a removal module configured to remove content for the shared resource from the source PDF document; and
   an extraction module configured to extract a record from the source PDF document, the extracted record void of content for the shared resource in response to the short-circuited link.

9. The apparatus of claim 8, wherein the extraction module is further configured to extract a record from the source PDF document using a PDF Application Programming Interface ("API").

10. The apparatus of claim 8, further comprising an indexing module configured to index data in the source PDF document, the apparatus further comprising a storage module configured to store the index data in a searchable repository.

11. The apparatus of claim 8, wherein the scanning module further comprises a direction module configured to direct a PDF API to signal each shared resource of the source PDF document that matches a predetermined criteria.

12. The apparatus of claim 8, further comprising a configuration module configured to receive configuration information that defines a set of shared resources from among the shared resources of the source PDF document.

13. A computer program product comprising a non-transitory computer readable storage medium having computer usable program code executable by a processor to perform operations for improved Portable Document Format ("PDF") document archiving, the operations of the computer program product comprising:
   scanning a source Portable Document Format ("PDF") document for a shared resource, the source PDF document comprising a plurality of records, the shared resource comprising a common resource referenced by way of a resource pointer associated with a record of the source PDF document;
   copying the shared resource to a resource group associated with the source PDF document;
   modifying the resource pointer to point to the copied shared resource in the resource group such that a link between the shared resource and the resource pointer in each record that points to the shared resource is short-circuited;
   removing content for the shared resource from the source PDF document; and
   extracting a record from the source PDF document using a PDF Application Programming Interface ("API"), the extracted record void of content for the shared resource in response to the short-circuited link.

14. The computer program product of claim 13, wherein modifying the resource pointer further comprises setting the resource pointer to a resource identifier assigned by a PDF Application Programming Interface ("API") that stores the shared resource in the resource group.

15. The computer program product of claim 13, further comprising indexing index data in the source PDF document and storing the index data in a searchable repository.

16. The computer program product of claim 13, further comprising receiving configuration information that defines a set of shared resources from among the shared resources of the source PDF document.

* * * * *